(12) United States Patent
Banks et al.

(10) Patent No.: US 9,158,933 B2
(45) Date of Patent: Oct. 13, 2015

(54) PROTECTION OF ENCRYPTION KEYS IN A DATABASE

(75) Inventors: Barbara Jane Banks, Berkeley, CA (US); Rajnish Kumar Chitkara, Fremont, CA (US); Shiping Chen, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 1128 days.

(21) Appl. No.: 12/464,617

(22) Filed: May 12, 2009

(65) Prior Publication Data
US 2010/0290623 A1    Nov. 18, 2010

(51) Int. Cl.
| | | |
|---|---|---|
| *H04L 9/08* | (2006.01) | |
| *H04L 9/00* | (2006.01) | |
| *G06F 21/00* | (2013.01) | |
| *G06F 7/04* | (2006.01) | |
| *H04L 29/06* | (2006.01) | |
| *G06F 21/62* | (2013.01) | |

(52) U.S. Cl.
CPC .......... *G06F 21/6227* (2013.01); *H04L 9/0863* (2013.01); *H04L 9/0891* (2013.01); *H04L 9/0894* (2013.01)

(58) Field of Classification Search
CPC ... H04L 9/0822; H04L 9/0863; H04L 9/0825; H04L 9/085; H04L 9/14; H04L 63/105; G06F 21/6209; G06F 21/6218; G06Q 20/3829; H04W 12/04
USPC ............ 713/194, 182, 183; 380/279, 281, 44, 380/45, 46, 47, 277, 278, 282, 283, 284, 380/285, 286; 726/2, 3, 4, 5, 6, 26, 27, 28
See application file for complete search history.

(56) References Cited

U.S. PATENT DOCUMENTS

| | | | |
|---|---|---|---|
| 4,375,579 A | 3/1983 | Davida et al. | |
| 5,163,097 A | 11/1992 | Pegg | |
| 5,191,611 A | 3/1993 | Lang | |
| 5,228,094 A | 7/1993 | Villa | |
| 5,606,610 A | 2/1997 | Johansson | |
| 5,719,941 A * | 2/1998 | Swift et al. ..................... | 713/155 |
| 5,737,419 A | 4/1998 | Ganesan | |
| 5,790,668 A * | 8/1998 | Tomko ........................... | 713/186 |

(Continued)

OTHER PUBLICATIONS

International Preliminary Report on Patentability in re: PCT/US2010/033699 mailed Nov. 24, 2011.

(Continued)

*Primary Examiner* — Tae Kim
(74) *Attorney, Agent, or Firm* — Sterne, Kessler, Goldstein & Fox PLLC

(57) ABSTRACT

System, method, computer program product embodiments and combinations and sub-combinations thereof for protection of encryption keys in a database are described herein. An embodiment includes a master key and a dual master key, both of which are used to encrypt encryption keys in a database. To access encrypted data, the master key and dual master key must be supplied to a database server by two separate entities, thus requiring dual control of the master and dual master keys. Furthermore, passwords for the master and dual master keys must be supplied separately and independently, thus requiring split knowledge to access the master and dual master keys. In another embodiment, a master key and a key encryption key derived from a user password is used for dual control. An embodiment also includes supplying the secrets for the master key and dual master key through server-private files.

24 Claims, 13 Drawing Sheets

(56) References Cited

U.S. PATENT DOCUMENTS

| | | | |
|---|---|---|---|
| 5,920,630 A | 7/1999 | Wertheimer et al. | |
| 5,924,094 A | 7/1999 | Sutter | |
| 5,940,823 A * | 8/1999 | Schreiber et al. | 707/741 |
| 5,956,400 A | 9/1999 | Chaum et al. | |
| 5,987,440 A | 11/1999 | O'Neil et al. | |
| 5,991,399 A | 11/1999 | Graunke et al. | |
| 6,029,160 A | 2/2000 | Cabrera et al. | |
| 6,038,315 A | 3/2000 | Strait et al. | |
| 6,044,155 A * | 3/2000 | Thomlinson et al. | 713/155 |
| 6,185,685 B1 | 2/2001 | Morgan et al. | |
| 6,233,617 B1 | 5/2001 | Rothwein et al. | |
| 6,327,595 B1 | 12/2001 | Lyson et al. | |
| 6,336,121 B1 | 1/2002 | Lyson et al. | |
| 6,360,324 B2 | 3/2002 | Van | |
| 6,446,092 B1 | 9/2002 | Sutter | |
| 6,549,626 B1 * | 4/2003 | Al-Salqan | 380/286 |
| 6,963,980 B1 * | 11/2005 | Mattsson | 713/194 |
| 7,093,137 B1 | 8/2006 | Sato et al. | |
| 7,111,005 B1 | 9/2006 | Wessman | |
| 7,152,067 B2 | 12/2006 | Yagawa et al. | |
| 7,155,612 B2 | 12/2006 | Licis | |
| 7,266,699 B2 | 9/2007 | Newman et al. | |
| 7,269,729 B2 * | 9/2007 | He et al. | 713/166 |
| 7,548,621 B1 * | 6/2009 | Smith et al. | 380/277 |
| 7,565,539 B2 * | 7/2009 | Agarwal | 713/171 |
| 7,580,521 B1 * | 8/2009 | Spies et al. | 380/44 |
| 7,743,069 B2 | 6/2010 | Chitkara et al. | |
| 7,797,342 B2 | 9/2010 | Banks et al. | |
| 7,860,246 B2 * | 12/2010 | Cerruti et al. | 380/42 |
| 8,225,108 B2 * | 7/2012 | Peterson | 713/193 |
| 2001/0056541 A1 | 12/2001 | Matsuzaki et al. | |
| 2002/0071566 A1 * | 6/2002 | Kurn | 380/281 |
| 2003/0123671 A1 * | 7/2003 | He et al. | 380/282 |
| 2003/0210791 A1 * | 11/2003 | Binder | 380/277 |
| 2004/0255133 A1 | 12/2004 | Lei et al. | |
| 2005/0027723 A1 | 2/2005 | Jones et al. | |
| 2005/0157880 A1 * | 7/2005 | Kurn et al. | 380/279 |
| 2005/0198490 A1 | 9/2005 | Jaganathan et al. | |
| 2006/0053112 A1 | 3/2006 | Chitkara et al. | |
| 2007/0079119 A1 | 4/2007 | Mattsson et al. | |
| 2008/0077806 A1 | 3/2008 | Cui et al. | |

OTHER PUBLICATIONS

Ehrsam, W.F. et al., "A cryptographic key management scheme for implementing the Data Encryption Standard," *IBM System Journal*, pp. 106-125, vol. 17, Issue 2, 1978.

Mattsson, U., "A Database Encryption Solution That is Protecting Against External and Internal Threats, and Meeting Regulatory Requirements," downloaded from http://www.net-security.org/dl/articles/database$_{13}$ encryption.pdf, 8 pages, Jul. 28, 2004.

*Oracle Database Security Guide*, 10g Release 1 (10.1) Part No. B10773-01, Chapter 14, pp. 14-1 to 14-48, Dec. 2003 (See particularly "Column Masking Behavior" at 14-42 to 14-44).

International Search Report and Written Opinion, dated Nov. 26, 2010, for PCT Appl. No. PCT/US2010/033699, 9 pages.

* cited by examiner

PROTECTION OF ENCRYPTION KEYS IN A DATABASE

CROSS REFERENCE TO RELATED APPLICATIONS

This patent application is related to U.S. patent application Ser. No. 11/840,306, filed on Aug. 17, 2007, entitled "Database System Providing Encrypted Column Support for Applications," which is incorporated by reference herein in its entirety.

BACKGROUND

1. Field of the Invention

The present invention is directed to the protection of encryption keys in a database.

2. Background Art

In recent years there have been numerous incidents of identity theft and credit card fraud resulting in damages reaching into the hundreds of millions of dollars. As a result, protection against such threats is a priority of any business that handles confidential user data.

Retailers, online merchants, universities and health care organizations are tightening security around personally identifiable information (PII) such as social security numbers. Merchants and service providers who process credit card data are required to comply with the Payment Card Industry Data Security Standard (PCI-DSS).

The Payment Card Industry Data Security Standard (PCI-DSS) is a set of requirements for payment card security, authored by the PCI Security Standards Council and includes requirements for security management, policies, procedures, network architecture, software design and other critical protective measures.

One way of protecting data and complying with PCI-DSS is by using encryption techniques on databases that store the data. Encryption is important for protecting data in transit and at rest. By using encryption, even if an intruder or any other threat circumvents other network security controls and gains access to encrypted data, without the proper cryptographic keys, the data is unreadable and unusable to that person.

Accordingly, systems, methods and computer program products are needed that offer robust methods of key encryption while complying with security standards that may exist, such as, but not limited to, PCI-DSS.

BRIEF SUMMARY

Briefly stated, the invention includes system, method, computer program product embodiments and combinations and sub-combinations thereof for protection of encryption keys in a database.

An embodiment includes a master key and a dual master key, both of which are used to encrypt encryption keys in a database using dual control and split knowledge. Thus, before any user accesses encrypted data, both the master key and dual master key must be supplied to a database server by two separate entities (e.g. two key custodians), thus requiring dual control of the encrypted data. Furthermore, both the master key and the dual master key are protected using passwords which must be supplied separately and independently through SQL commands, thus requiring split knowledge to access the master and dual master keys.

Another embodiment includes a master key and a key encryption key derived from a user password. In this embodiment, before any user accesses encrypted data, both the master key and the derived key must be supplied to the database server by two entities, thus fulfilling dual control of the keys. The password for the master key and the password to derive the key encryption key must be supplied separately through SQL commands, thus requiring split knowledge of the passwords.

Yet another embodiment includes supplying secrets (or passwords) for the master key and dual master key through server-private files (called master key startup files). The owner of the master key or dual master key can create an automatic access key copy for the master or dual master key. The key custodian or the system security officer can then configure the database server to access the master and dual master keys automatically without requiring key custodians to input the passwords. In this embodiment, whenever a master or dual master key is needed, the database server reads the master key encryption key from a master key startup file or the dual master key encryption key from a dual master key startup file and decrypts the automatic access key copy to get the master or dual master key.

In this way, encryption keys in the database may be protected in a manner such that two entities must independently supply a password unknown to each other before any database user can access encrypted data. This allows embodiments of the invention to provide for split knowledge and dual control of keys allowing for improved protection of encryption keys.

Further embodiments, features, and advantages of the invention, as well as the structure and operation of the various embodiments of the invention are, described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
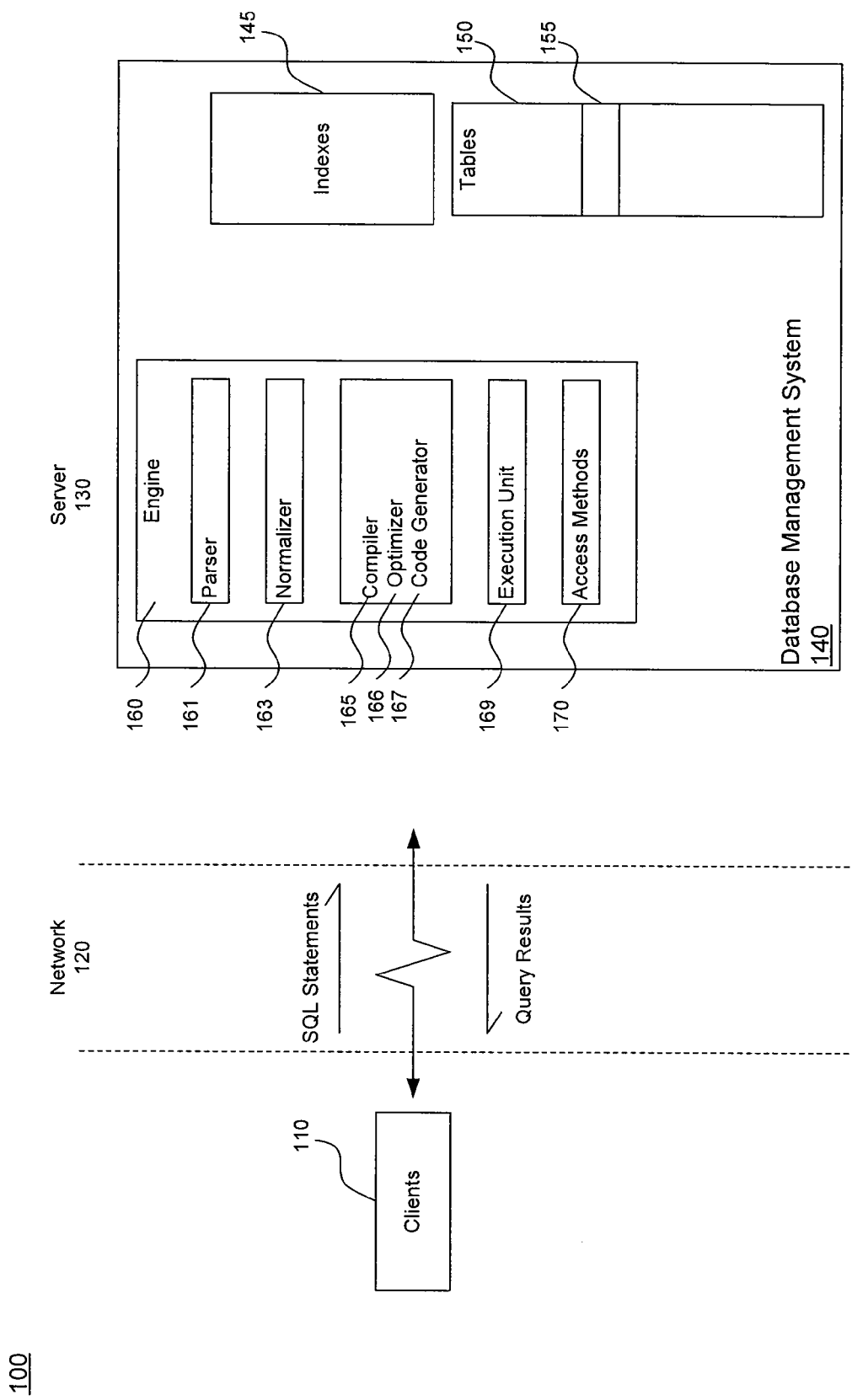
FIG. 1 illustrates an exemplary database management system (DBMS), according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "key," as used herein, refers to any form of secret information. As an example, a key may include a string of bits with a length that is dependent on the encryption algorithm.

The term "key custodian," according to an embodiment, refers to any entity or person managing keys and their passwords. As an example, the key custodian may be a user who has keycustodian_role. Keycustodian_role is a system role that contains the privileges needed for key management, such as creating encryption keys, altering encryption keys, etc.

The term "split knowledge," according to an embodiment, refers to a condition under which two or more entities separately have key components that, individually, convey no knowledge of the resultant cryptographic key.

The term "dual control," (or "multi-control") according to an embodiment, refers to a process of using two (or more) separate individuals (or entities), operating together (but with split knowledge) to protect sensitive functions or information so that no single person is able to access or use the materials (such as a cryptographic key).

The term "System Security Officer (SSO)," according to an embodiment, refers to a person that performs security-related tasks. The SSO can access any database (e.g., to enable auditing) but, in general, has no special permissions on database objects. Security tasks include: Granting and revoking the System Security Officer and Key Custodian roles; Administering the audit system; Changing passwords; Adding new logins; Locking and unlocking login accounts; Creating and granting user-defined roles; Administering network-based security; and Granting permission to use the set proxy or set session authorization commands; and Setting the password expiration interval. sso_role is a system role that grants the privileges to the SSO.

DBMS Overview

Embodiments of the invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. SQL statements received from clients 110 are processed by query engine 160 of the DBMS 140. SQL is well known and is described in many publicly available documents, including "Information Technology—Database languages—SQL," published by the American National Standards Institute as American National Standard ANSI/ISO/IEC 9075: 1992, which is hereby incorporated by reference in its entirety.

In an embodiment, query engine 160 comprises parser 161, normalizer 163, compiler 165, query optimizer 166, code generator 167, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 may perform error checking, such as confirming that table names and column names which appear in the query are valid (e.g., are available and belong together). The normalizer 163 may also look up any referential integrity constraints which exist and add those to the query.

After normalization, the query tree is passed to the compiler 165, which includes query optimizer 166 and a code generator 167. Query optimizer 166 is responsible for optimizing the query tree. In an embodiment, query optimizer 166 performs a cost-based analysis for formulating a query execution plan. Query optimizer 166 will, for example, select the join order of tables, and select relevant indexes 145. Query optimizer 166, therefore, performs an analysis of the query and determines the best execution plan, from a plurality of generated execution plans, where "best" is judged according to any defined criteria, which in turn results in particular access methods 170 being invoked during query execution by the execution unit 169.

Key Management Overview

Key management includes both generation and secure storage of cryptographic keys, one of the most important aspects of encryption. In an embodiment, large key sizes (at least 128 bits) are provided, although in general the invention can operate with keys of any size. Users can create keys with lengths 192, 256, or greater for better security.

As an example, database server 130 encrypts keys on disk using any encryption algorithm such as the well known AES algorithm. The vulnerability of key storage lies with the user supplied password that is used to protect the key. If user-supplied passwords are too short or easy to guess, the security of the encryption keys may be compromised.

Keys can be further protected by having a limited lifetime. If the user suspects that an attacker may have obtained his key, the key should be considered compromised, and its use discontinued. The user can create another key, perform an alter table to encrypt the data with the new key, and then discard the compromised key. The creation date of a key is stored in "sysobjects" (system table) so the user can determine how old it is and if it needs to be changed. Changing the keys generally necessitates that the table be inaccessible while the data is being decrypted and re-encrypted with a new key.

Figure 2:
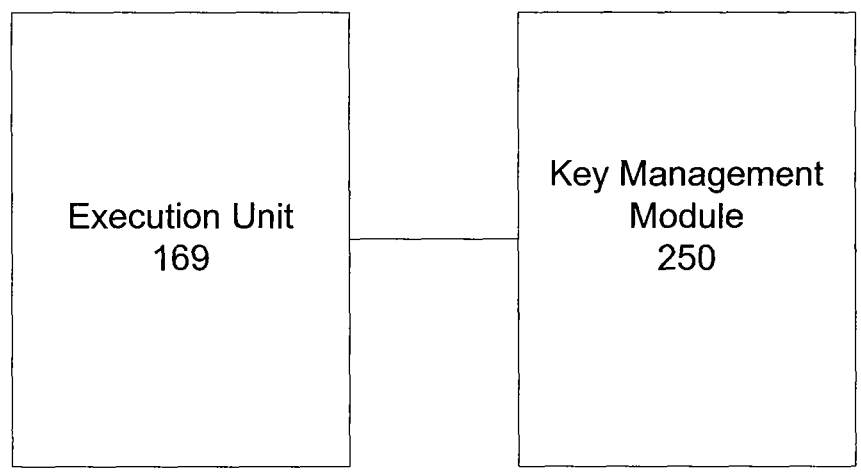
FIG. 2 illustrates a key management module, according to an embodiment of the invention.

FIG. 2 illustrates key management module 250 associated with execution unit 169. In an embodiment, not intended to limit the invention, the functions of the present invention occur during the query execution phase. For example, the process of managing an encryption key is performed during the query execution phase, which is performed by key management module 250. Therefore, key management module 250 within database server 130 includes functionality for creating, altering, and dropping encryption keys.

Master Key

In an embodiment, the master key is a database-level key, created by a user with sso_role or keycustodian_role, and is used as a key encryption key (KEK) or part of KEK for user-created encryption keys. The dual master key is also a database-level key, created by a user with sso_role or keycustodian_role, and is used as a KEK together with a master key to protect user-created encryption keys. To achieve split knowledge and dual control, the creator of the dual master key of a database must be different from the user who created the master key in the same database. As an example, not intended to limit the invention, a master key is defined by entries in a 'sysobjects' system table and a 'sysencryptkeys' system table, with an exemplary internal name 'sybencrmasterkey'. Also, for example, a dual master key may use the internal name 'sybencrdualmasterkey'.

The master key can also be used in combination with a key encryption key derived from an explicit password to provide dual control and split knowledge for user-created encryption keys.

Creating the Master Key and Dual Master Key

As described earlier, the master key and the dual master key are database-level keys, created by a user with sso_role or keycustodian_role.

An exemplary syntax for creating a master key or a dual master key is:

```
create encryption key [dual] master
    [for AES] with passwd <char_literal>
```

In the above syntax, 'master' and 'dual master' describe database level keys that are used only to encrypt other keys within the same database. The master and dual master keys are key encryption keys and are not used to encrypt data.

The parameter "with passwd" is used to supply a character-string password that is used to password protect the master key or dual master key. In an embodiment, the "with passwd" clause is mandatory for both the master key and dual master key. The password should be complex enough to avoid vulnerabilities.

In an embodiment, there may be one master key and one dual master key per database.

Figure 3A:
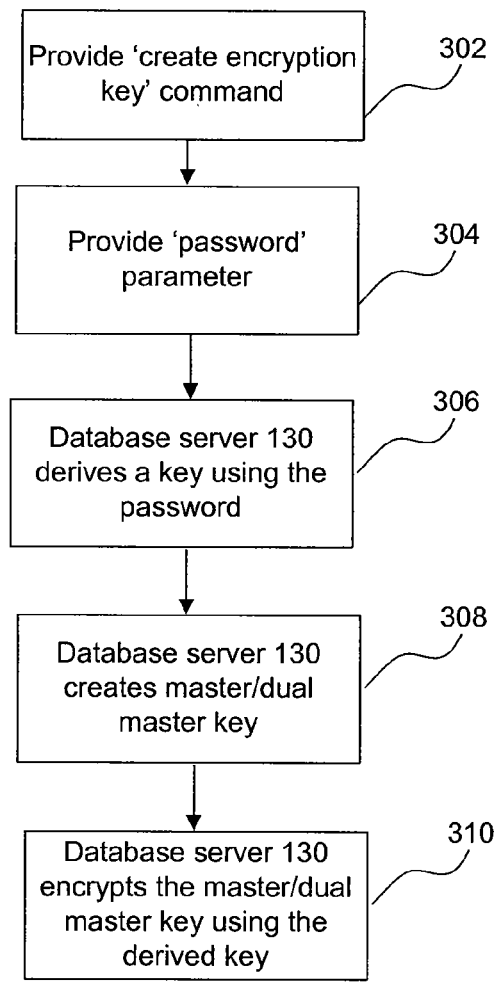
FIG. 3A is a flowchart illustrating the creation of a master key and of a dual master key, according to an embodiment of the invention.

An exemplary method for creation of a master or dual master key, according to an embodiment of the invention, will now be described with reference to flowchart 300 in FIG. 3A.

In step 302, a user provides a 'create encryption key' command to database server 130.

In step 304, the user provides a 'password' parameter to derive the KEK that protects the master or dual master key.

In step 306, database server 130 derives a key from the password received in step 304.

In step 308, database server 130 creates the master or dual master key using input received in steps 302 and 304.

In step 310, database server 130 encrypts the master/dual master key using the key derived in step 306.

In an embodiment, database server 130 enforces separate ownership of the master and dual master keys.

Consider the following exemplary syntax:

```
create encryption key master
    with passwd 'unforgettablethatswhatur'
```

When the above command is issued by a user with sso_role or keycustodian_role, database server 130 creates a new master key with an internal name 'sybencrmasterkey', encrypted by a KEK derived from 'unforgettablethatswhatur'.

As described earlier, a dual master key is created by specifying the "dual master" parameter after the "create encryption key" syntax. As an example, the dual master key may be created after the creation of a master key.

Consider the following exemplary syntax:

```
create encryption key dual master
    with passwd 'doublyunforgettable'
```

When the above command is issued by a user with sso_role or keycustodian_role, database server creates a key with the internal name 'sybencrdualmasterkey', encrypted by a key encryption key (KEK) derived from 'doublyunforgettable'.

Database server 130 then uses the dual master key in combination with the master key, when a user specifies with 'dual_control', on the CREATE ENCRYPTION KEY, and ALTER ENCRYPTION KEY statements.

Setting Encryption Password for Master and Dual Master Key

As described earlier, the passwords for the master and dual master key must be supplied to the server by separate entities (e.g. the key owners) before the keys can be used.

When the above command is issued by a key custodian database server 130 stores the password in its memory until an encryption of decryption operation requires use of the master or dual master key. At that point database server 130 decrypts the master or dual master key using a KEK derived from the stored password.

An exemplary syntax for setting encryption password for the master or dual master key in a database, using embodiments of the invention, is as follows:

set encryption passwd 'password_phrase'
    for key [dual] master

Protecting Encryption Keys with Master and Dual Master Keys

An exemplary syntax for creating keys, using embodiments of the invention, is as follows:

```
create encryption key keyname [as default]
    [for algorithm_name]
    [with [keylength numbits]
    [passwd 'password_phrase']
    [init_vector {NULL|random}]
    [pad {NULL|random}]
    [[no] dual_control]]
```

Where, '[no] dual_control' indicates whether the new key should be encrypted using (or not using) dual control. In an embodiment, the default configuration is one that includes no dual control.

The following examples show the role of the master key as KEK for encryption keys. If a master key has been created, it becomes the default key for protecting encryption keys that do not specify a password.

The following exemplary syntax encrypts 'k1' with the master key.

create encryption key k1 with keylength 192

Figure 3B:
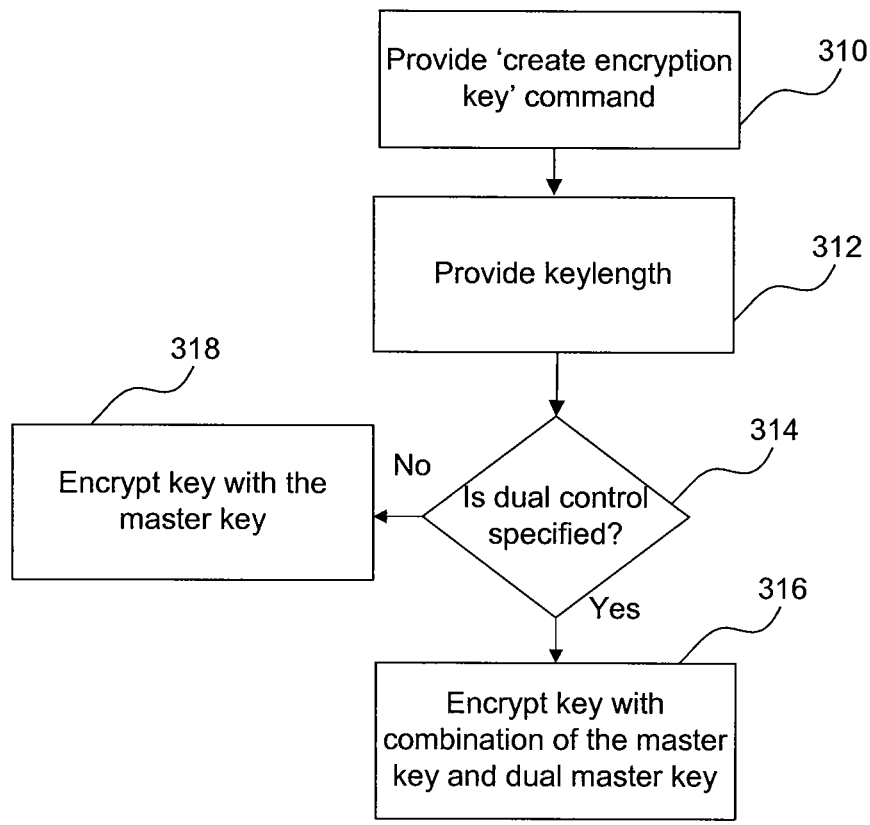
FIG. 3B is a flowchart illustrating an exemplary method for encryption of a key using a master key (and a dual master key), according to an embodiment of the invention

FIG. 3B illustrates an exemplary method 308 for encryption of a key, according to the exemplary syntax shown above.

In step 310, a user provides a 'create encryption key' command to database server 130.

In step 312, the user provides a keylength parameter. For example, and as shown in the exemplary syntax, the keylength parameter may be 192 bits.

In step 314, database server 130 checks if the user has specified use of dual control. If the use of dual control is specified, database server 130 encrypts the key with a combination of the master key and the dual master key (step 316).

Returning to step 314, if dual control is not specified, database server 130 encrypts the key with the master key (step 318).

The next exemplary syntax encrypts 'k2' with a combination of the master key and the dual master key:

```
create encryption key k2 with init_vector random
    dual_control
```

The following exemplary command encrypts 'k3' with a combination of the master key and a key derived from 'Ybother'. A dual master key is not used in this scenario of dual control. In this example, dual control and split knowledge exists between the owner of the master key and the owner of 'k3'.

```
create encryption key k3
    with passwd 'Ybother'
    dual_control
```

Figure 3C:
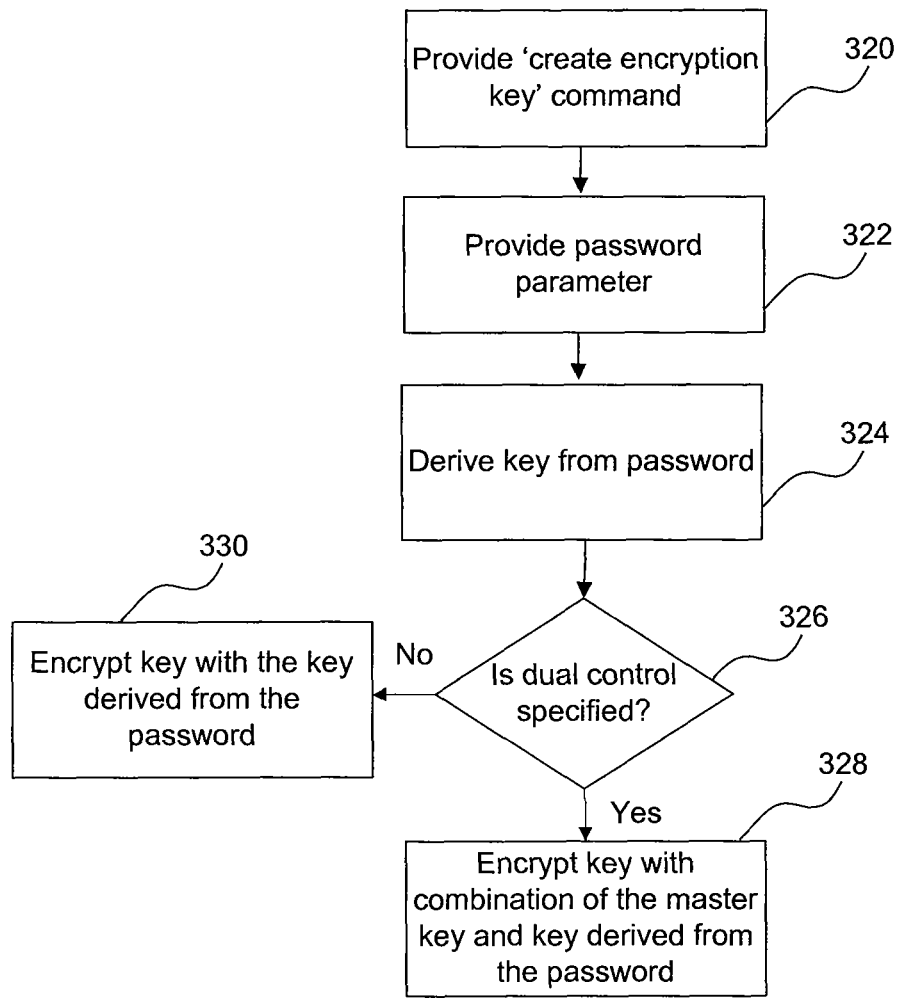
FIG. 3C is a flowchart illustrating an exemplary method for encryption of a key using a derived key, or a derived key and a master key, according to an embodiment of the invention.

FIG. 3C illustrates an exemplary method 319 for encryption of a key using a password, according to the exemplary syntax shown above.

In step 320, a user provides a 'create encryption key' command to database server 130.

In step 322, the user provides a password parameter. For example, and as shown in the exemplary syntax, the password parameter may be 'Ybother'.

In step 324, the database server 130 derives an encryption key from the password provided by the user in step 322.

In step 326, database server 130 checks if the user has specified use of dual control. If the use of dual control is specified, database server 130 encrypts the key with a combination of the master key and the key derived from password (e.g. a key derived from the password 'Ybother') (step 328).

Returning to step 326, if dual control is not specified (step 326), database server 130 encrypts the key with the key derived from the password (step 330).

Encryption using a combination of master key and a key derived from a password must be done in such a way that the master key can be regenerated and the affected encryption keys re-encrypted without knowledge of the key's password (i.e. the second secret). In an embodiment, such operation can be achieved by encrypting the raw encryption key twice, first by the key derived from the password and secondly by the master key.

Altering Encryption Key Specification to Use a Master Key

As described earlier, database server 130 uses a master key as a KEK, if the master key exists, and when a create encryption key does not specify a password to be used as the KEK.

An exemplary 'alter encryption key' syntax for encryption keys is follows:

```
alter encryption key keyname
    [as|not default]
    [with passwd 'password'
    | passwd login_passwd
    | master key]
    modify encryption
    [with paswd 'password'
    | passwd login_passwd
    | master key]
    [no] dual_control]
```

Where, master key (on the WITH clause preceding the MODIFY verb)—indicates that current encryption uses the master key. In an embodiment, it may not be necessary to specify passwd login_passwd, nor a master key because database server 130 determines how a key is encrypted from status bits in the 'sysencryptkeys' system table master key (on the WITH clause following the MODIFY verb)—indicates that the key is to be re-encrypted with the master key.

[no] dual control—indicates whether the key's encryption should be under dual control. In an embodiment, the default configuration is no dual control.

The following examples illustrate database server 130's operation for altering encryption key specification, according to embodiments of the invention.

Example 1

In this example, k1 is currently encrypted by user password 'goodbye2U'. The user wants to use the master key as k1's KEK. In this exemplary syntax, the 'with master key' clause after the MODIFY action allows the user to change the encryption to use the master key.

```
alter encryption key k1
    with passwd 'goodbye2U'
    modify encryption
    with master key
```

Figure 3D:
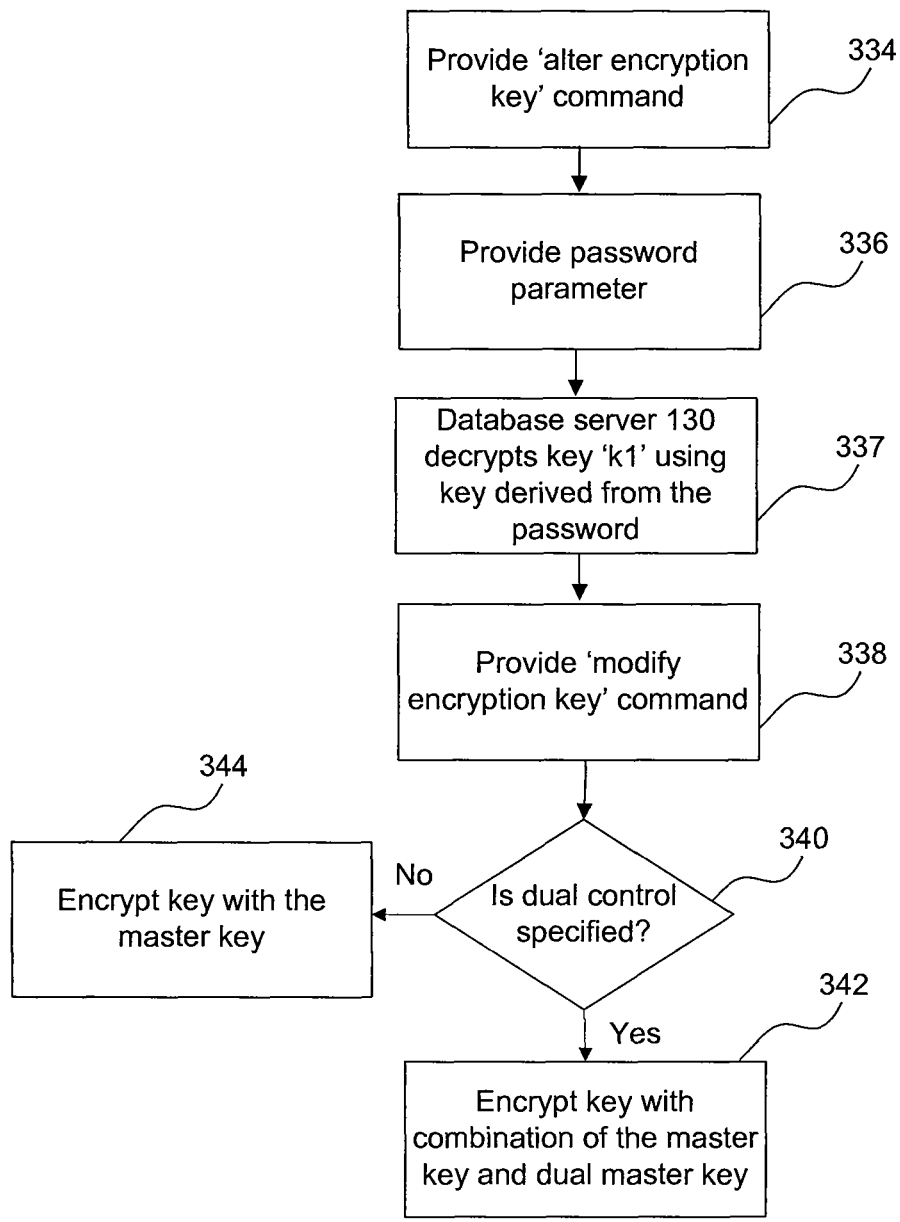
FIG. 3D is a flowchart illustrating an exemplary method for altering encryption of a key, according to an embodiment of the invention.

FIG. 3D illustrates an exemplary method 332 for altering encryption of a key which is currently encrypted by a password, according to the exemplary syntax shown above.

In step 334, a user provides a 'alter encryption key' command to database server 130.

In step 336, the user provides a password parameter. For example, and as shown in the exemplary syntax, the password parameter may be the password which is currently used to encrypt key 'k1'.

In step 337, database server 130 decrypts key 'k1' using a key derived from the password in step 336.

In step 338, a 'modify encryption key' command is provided to database server 130.

In step 340, database server 130 checks if the user has specified use of dual control. If the use of dual control is specified, database server 130 encrypts the key with a combination of the master key and the dual master key (step 342).

Returning to step 340, if dual control is not specified, database server 130 encrypts the key with the master key (step 344).

In this way, encryption of a key may be altered according to embodiments of the invention. The following examples show other embodiments of altering key encryption.

Example 2

In this example, 'k2' is currently encrypted by the master key. This exemplary syntax alters 'k2' to re-encrypt under dual control by the master and the dual master key.

```
alter encryption key k2
modify encryption
with master key
dual_control
```

Alternatively, the following syntax may be used to re-encrypt 'k2':

```
alter encryption key k2
modify encryption
with dual_control
```

Example 3

In this example, 'k3' is currently encrypted under dual control using the password 'Bnice2day' and the master key. This exemplary syntax removes dual control from 'k3' and returns it to a form under single control of a KEK derived from 'Bnice2day'.

alter encryption key k3 with passwd 'Bnice2day'

```
modify encryption
with passwd 'Bnice2day'
no dual_control
```

In an embodiment, database server 130 can alter a password protected encryption key to single control without knowledge of its password because the dual control will internally take the form of an "inner" encryption by the KEK derived from the password followed by an "outer" encryption by the master key. Removing dual control amounts to decrypting with the master key.

Example 4

In this example, if 'k4' is currently encrypted by the master key, the following command will encrypt it for dual control using a key derived from the passwd 'BytheC' and the master key.

```
alter encryption key k4
modify encryption
with passwd 'BytheC'
dual_control
```

Configuration Option for Automatic Master Key Access

In an embodiment, there exists a configuration option for automatic master key access, settable by a user with an sso_role. The automatic master key access configuration indicates if database server 130 should operate in automatic master key access mode. Such a configuration option includes an integer argument, where value '1' turns the option on and '0' turns it off.

As described earlier, in automatic master key access mode, database server 130 enables users to access the master keys of databases even the passwords of the master keys are not set if automatic_access key copies are available for those master keys.

In an embodiment, database server 130 writes the KEK of the master or dual master key to the master key startup file or the dual master key startup file when the master key or dual master key is altered to add a key copy for automatic_access. (In this description, KEKs that encrypt the master or dual master keys are referred to as external MKEKs.)

When the server boots with automatic master key access configured, or when automatic master key access is enabled, database server 130 reads in the external MKEKs for the master and dual master keys for all databases from the server-private master key startup files into the server memory.

When the master or dual master key is accessed in a database, instead of retrieving the base key (the original master or dual master key), database server 130 retrieves the automatic_access key copy, and decrypts the key copy with the MKEK fetched from the server memory.

Figure 3E:
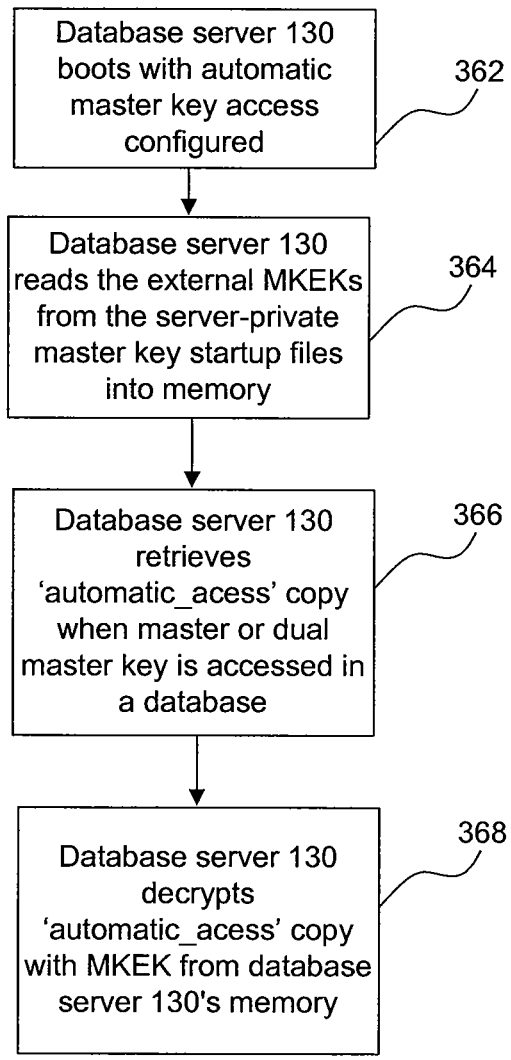
FIG. 3E is a flowchart illustrating an exemplary method for operation of a database server with automatic master key access configured, according to an embodiment of the invention.

FIG. 3E illustrates an exemplary method 360 for operation of database server 103 with automatic master key access configured.

In step 362, database server 130 boots with automatic master key access configured.

In step 364, database server 130 reads the external MKEKs from the server private master key start-up files into memory.

In step 366, database server 130 retrieves the 'automatic_access' copy when the master or dual master key is accessed in database 130.

In step 368, database server decrypts the 'automatic_access' copy with MKEKs from database server 130's memory.

If automatic master key access is configured and the master key or the dual master key of a database has an automatic_access copy, the master or dual master key cannot be accessed until the external MKEKs are available to database server 130.

In an embodiment, the SSO can specify specific master key or dual master key startup file names and locations through an administrative command such as "sp_encryption mkey_startup_file". If no specific master key startup file names and locations are specified, the default master key startup files may be used, for example, in a directory which contains security related files.

Master Key Copies for Automatic Access and Key Recovery

In an embodiment, database server 130 is configured in an 'automatic master key access' mode. In the automatic master key access mode, database server 130 may be able to access the master keys of a database even if the passwords of the master keys are not set in a server memory.

In the automatic master key access mode, database server 130 decrypts the master keys using master KEKs read from a master key startup file. To configure database server 130 in automatic master key access mode, in addition to enabling automatic master key access at the server level, the SSO or key custodian needs to create automatic_access key copies for the master and dual master key in the database.

In an embodiment, a master key or dual master key can be altered to add key copies. Master key copies are required to provide access to the master key or dual master key for automatic master key access and to support recovery of the master keys.

An exemplary syntax for adding master key copies follows:

```
alter encryption key [dual] master
with passwd<char_string>
add encryption
{with passwd <char_string>
for user <username> for recovery
| for automatic_access}
```

Where,
  passwd (first reference)—specifies the password that currently encrypts the base master or dual master key.
  passwd (second reference)—must be supplied for a recovery master key copy. It may not be used for an automatic_access master key copy.
  for user—indicates the user to whom the recovery key copy is to be assigned. As an example, any user in the database other than a key owner can be the assignee for the key recovery copy.
  for recovery—indicates that the key copy is to be used to recover the master or dual master key in case of a lost password.
  for automatic_access—indicates that the key copy is to be used to access the master/dual master key after database server 130, configured for "automatic master key access", boots.

When a master key copy is added for automatic_access, database server 130 internally creates a MKEK from random data, encrypts the master key copy and also writes out the MKEK to the default or configured server-private master key startup file supplied through an administrative command such as 'sp_encryption mkey_startup_file'.

When database server 130 next boots in "automatic master key access" mode, database server 130 will read the master key copy's MKEK from the master key startup file and use it to decrypt the master key's automatic_access copy.

If an automatic_access key copy has not been set up, the SSO or the key custodian must supply the master and dual master keys' passwords using a set encryption password command before users can access data encrypted by keys protected by the master key and the dual master key.

Figure 4A:
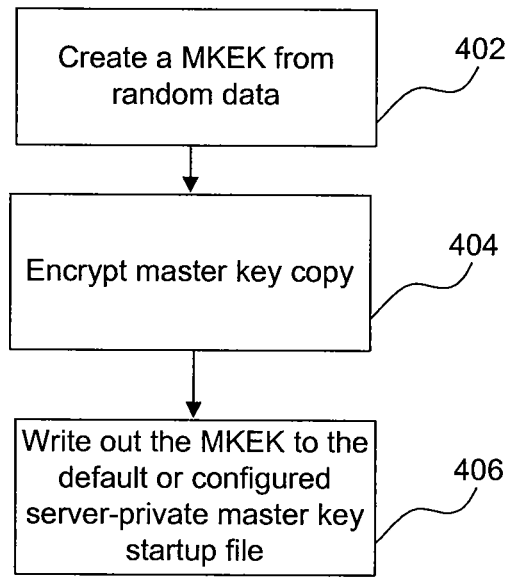
FIG. 4A is a flowchart illustrating writing of a master key encryption key to a master key startup file, according to an embodiment of the invention.

An exemplary method for writing a MKEK to a master key startup file, according to an embodiment of the invention, will now be described with reference to flowchart 400 in FIG. 4A.

In step 402, database server 130 creates a MKEK from random data.

In step 404, database server 130 encrypts the master key copy using the MKEK created in step 402.

In step 406, database server 130 writes the MKEK created in step 402 to a master key startup file.

Figure 4B:
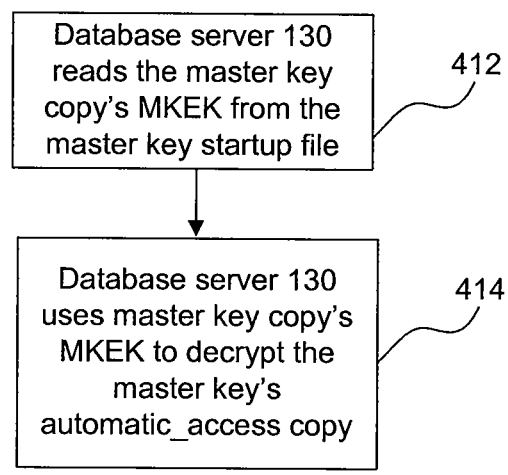
FIG. 4B is a flowchart illustrating decrypting a master key automatic access copy, according to an embodiment of the invention.

An exemplary method for decrypting a master key' automatic access copy, according to an embodiment of the invention, will now be described with reference to flowchart 410 in FIG. 4B.

In step 412, which occurs when database server 130 next boots in automatic master key access mode, database server 130 reads the master key copy's MKEK from the master key startup file.

In step 414, database server 130 uses the MKEK obtained in step 412 to the decrypt the master key's automatic access copy. A similar mechanism can be put in place to decrypt the dual master key's automatic access copy.

In this way, by allowing a split secret (e.g. master key and dual master key) to be securely applied to database server 130, the users can satisfy the requirements of dual control and split knowledge with automatic master key access of database server 130. Additionally, if database server 130 crashes or experiences a fault at any time, database operations can be restored using automatic master key access.

Altering Master Key Copies to Change Password/MKEK

Master key copies can be modified by the SSO or key custodian to change their passwords or, in the case of an automatic_access key copy, the internally generated, externally-stored MKEK.

An exemplary syntax for altering master key copies to change their password is:

```
alter encryption key [dual] master
   with passwd <char_string>
   { modify encryption
       with passwd <char_string>
       [for recovery]
   | modify encryption for automatic_access}
```

Where,
  passwd (first reference)—is the password specified on the create master key command or on the last command to alter the dual master or master key's password. If "[for recovery]" is specified, it is the current password of the recovery key copy.
  passwd (second reference)—is supplied for altering the password of a recovery master key copy. It supplies the new password for the recovery key copy.
  modify encryption—is used for changing either the explicit password on the base key, the recovery copy, or the automatic_access key copy.

The following exemplary syntax can be executed by a key custodian or the SSO (with knowledge of the master key's password) to change the external MKEK that is used to encrypt the automatic_access key copy of the master key:

```
alter encryption key master
   with passwd 'unforgettablethatswhatur'
   modify encryption for automatic_access
```

In an embodiment, when the automatic_access key copy is modified, database server 130 decrypts the base master key with a MKEK derived from 'passwd' ('unforgettablethatswhatur' in this example).

Database server 130 then creates a new external MKEK and replaces the previous one in the master key startup file. Then, database server 130 creates a new automatic_access key copy by encrypting the master key using the new external MKEK and replaces the old automatic_access key copy in sysencryptkeys with the new automatic_access key copy. In an embodiment, database server 130 changes the automatic_access key copy on the dual master key in the same manner as it does for the master key.

The following exemplary syntax changes the master key's encryption password from 'unforgetablethatswhatur' to 'cole1951'.

```
alter encryption key master
   with passwd 'unforgettablethatswhatur'
   modify encryption with passwd 'cole1951'
```

Figure 5:
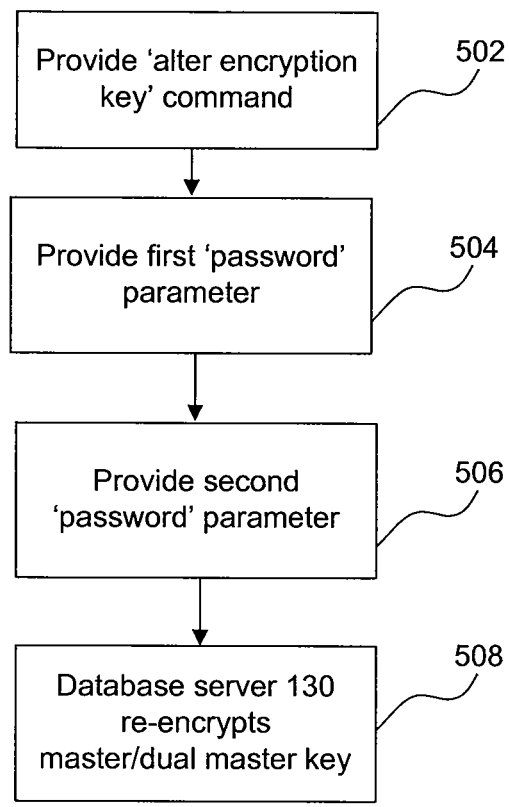
FIG. 5 is a flowchart illustrating altering of a master key or dual master key password, according to an embodiment of the invention.

An exemplary method for generating an altered master or dual master key, according to an embodiment of the invention, will now be described with reference to flowchart 500 in FIG. 5.

In step 502, a user (e.g. key custodian or SSO) provides a 'alter encryption key' command to database server 130.

In step 504, the user provides a first password parameter, which is the password that the user intends to change.

In step 506, the user provides a second password parameter, which is the new password that is to be associated with the master or dual master key.

In step 508, database server 130 re-encrypts master or dual master key based on input received from the user in steps 502, 504 and 506.

Recovering the Master Key or Dual Master Key

In an embodiment, the procedure for recovering the master or dual master key is the same as for recovering regular encryption keys.

An exemplary syntax for recovering the master or dual master key is as follows:

```
alter encryption key [dual] master
    with passwd <char_string>
    recover encryption
    with passwd <char_string>
```

The above syntax for recovering the master key can be executed by a key custodian or by the SSO. In the above syntax, the first 'passwd' reference is the password to the recovery key copy, obtained from a key recoverer. The second 'password' reference is the new password for the base key.

Regenerating the Master Key or Dual Master Key

As described earlier, the master and dual master keys are the KEKs for encryption keys. Good key management practices require that an administrator periodically change the KEKs by regenerating them.

In an embodiment, rather than allowing creation of more than one master or dual master key and then forcing users to alter each encryption key to be re-encrypted by the newer master and dual master, database server 130 supports regeneration of the master key using the 'regenerate' command.

The 'regenerate' command replaces the raw key value of the master or dual master keys with a new raw key and re-encrypts all encryption keys encrypted by the master or dual master keys.

An exemplary syntax for regenerating the master or dual master key is as follows:

```
alter encryption key [dual] master
    with passwd <char_string>
    regenerate key
    [with passwd <char_string>]
```

Figure 6:
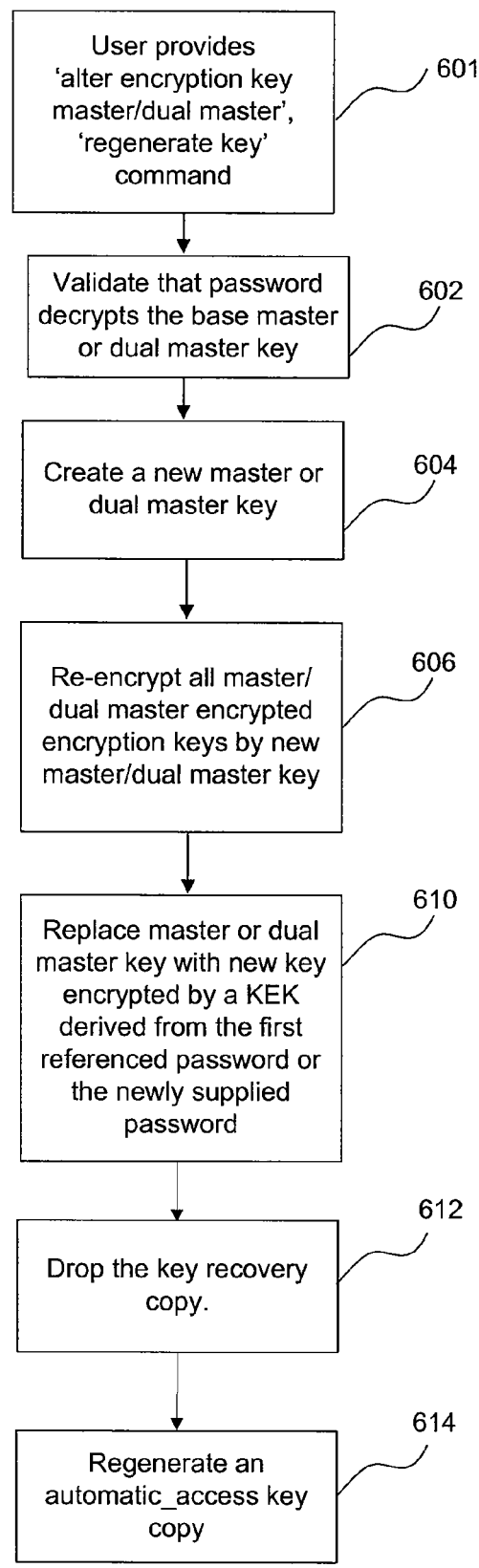
FIG. 6 is a flowchart illustrating regeneration of a master key or a dual master key, according to an embodiment of the invention.

FIG. 6 illustrates method 600 that describes the regeneration of a master or dual master key by database server 130.

In step 601, a user provides 'alter encryption key master/dual master regenerate key' command.

In step 602, database server 130 validates that 'passwd' decrypts the base master or dual master key.

In step 604, database server 130 creates a new master or dual master key.

In step 606, database server 130 re-encrypts all master/dual master-encrypted (solely or partially) encryption keys by the new master or dual master key.

In step 610, database server replaces master or dual master key with new key encrypted by a KEK derived from a) the first referenced 'passwd' if the second optional 'passwd' is not supplied or b) the newly supplied password.

In step 612, database server 130 discards the key recovery copy. The master key owner must execute alter encryption key to add a new recovery key copy and inform the designated key recover of the new password.

In step 614, database server 130 regenerates the automatic_access key copy if one exists.

Dropping Master Keys, Recovery Key Copy, or 'automatic_access' Key Copy

An exemplary syntax for discarding (or dropping) a master key or dual master key is as follows, drop encryption key [dual] master In an embodiment, database server 130 may disallow the 'drop' command if there remain any keys encrypted by the master or dual master key that are being dropped. The above command may be executed by a key custodian or the SSO.

In an embodiment, upon execution of the 'drop' command by database server 130, database server 130 drops the master key (or dual master key) and its key copies, i.e., the automatic access key copy and the recovery key copy and also removes the external MKEK from the master key startup file, if an automatic_access key copy exists.

As an example, a recovery key copy can be dropped with the following exemplary syntax:

alter encryption key [dual] master
    drop encryption for recovery

The automatic_access key copy, for example, is dropped with the following syntax, which will remove the external MKEK from the master key startup file, and will drop MKEK from the server memory if automatic master key access is configured:

```
alter encryption key [dual] master
    drop encryption for automatic_access
```

Figure 7:
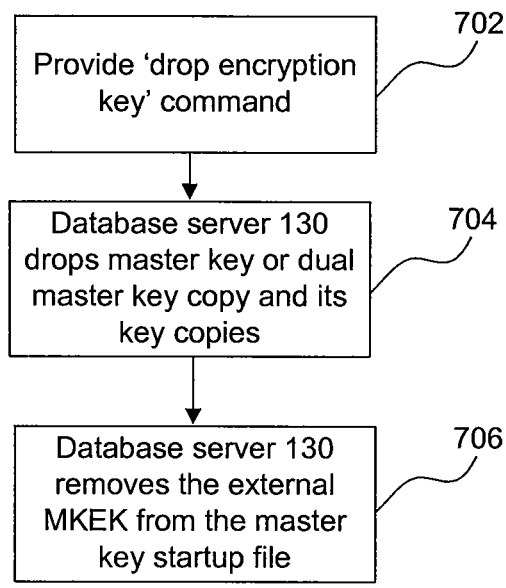
FIG. 7 is a flowchart illustrating an exemplary method for dropping a master or dual master key, according to an embodiment of the invention.

FIG. 7 illustrates an exemplary method 700 for dropping an encryption key, according to the exemplary syntax shown above.

In step 702, a user provides the 'drop encryption key' command to database server 130.

In step 704, database server 130 drops the master key or dual master key and its key copies.

In step 706, database server 130 removes the external MKEK from the master key startup file.

Example Computer Embodiment

Figure 8:
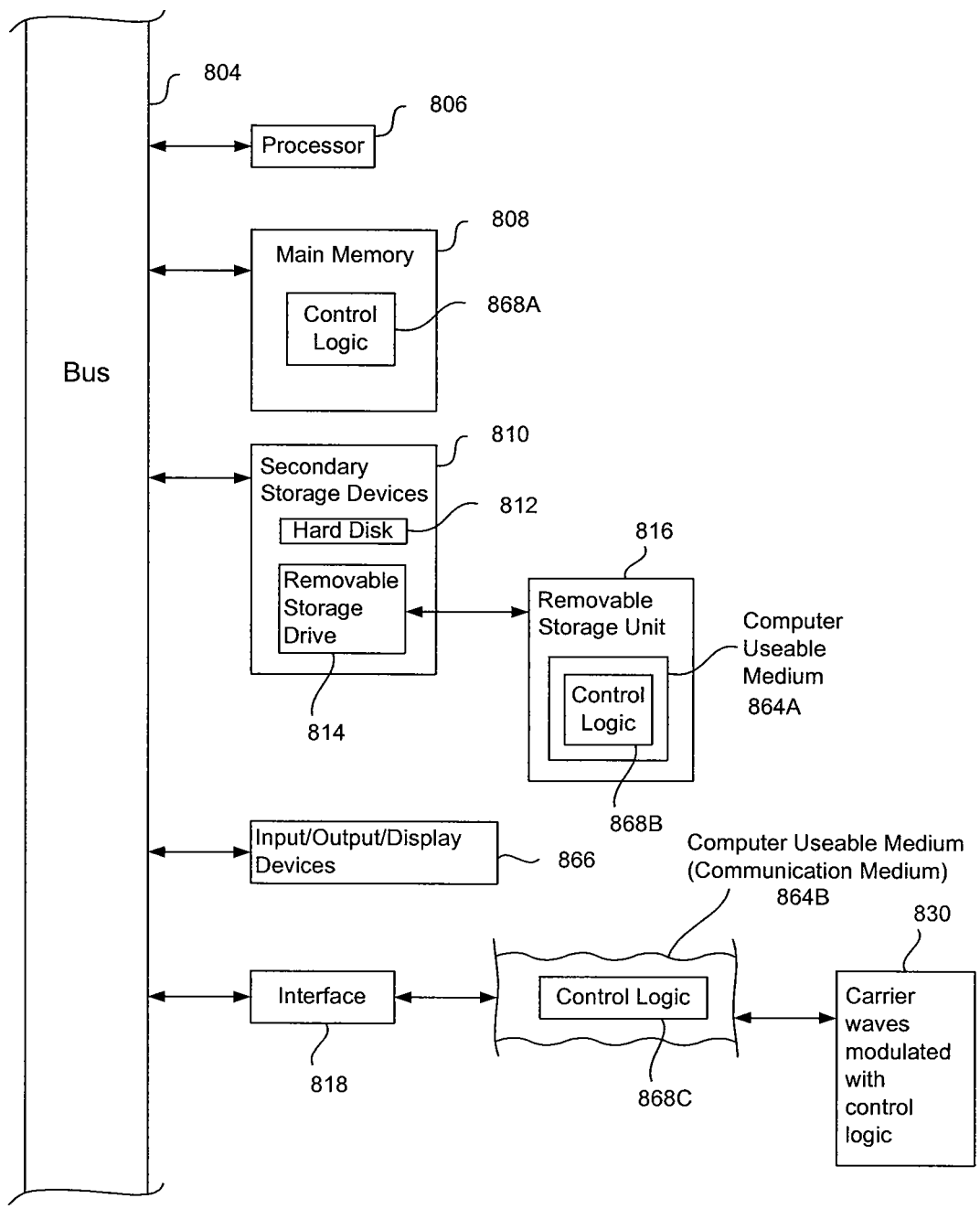
FIG. 8 illustrates an example computer useful for implementing components of embodiments of the invention.

In an embodiment of the present invention, the system and components of embodiments described herein are implemented using well known computers, such as example computer 802 shown in FIG. 8. For example, database server 130 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 826A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for protecting encryption keys in a database, comprising:
   receiving a first password at a database server from a first individual entity, wherein said database server is associated with said database;
   receiving a second password at said database server from a second individual entity;
   generating, by at least one microprocessor, a first key, wherein said first key is protected using said first password;
   generating a second key, wherein said second key is protected using said second password;
   encrypting a third key using said second key to generate an encrypted third key, said third key being included in said encryption keys of said database; and
   encrypting said encrypted third key using said first key, wherein use of said third key requires said first password to be provided to said database server by said first individual entity and said second password to be provided to said database server by said second individual entity, said first password being received at said database server separately and independently of said second password, said first individual entity being different and independent from said second individual entity, and said database server enforcing ownership of said first key by said first individual entity and enforcing ownership of said second key by said second individual entity.

2. The method of claim 1, wherein said generating, by the at least one microprocessor, said first key comprises:
   receiving a command to create said first key; and
   receiving said first password.

3. The method of claim 1, further comprising:
   configuring the database server in an automatic master key access mode.

4. The method of claim 3, wherein said configuring comprises:
   enabling automatic master key access for said database server; and
   creating automatic access key copies for said first key and said second key.

5. The method of claim 4, further comprising:
   creating a key encryption key from random data;
   encrypting a master key automatic access copy using said key encryption key; and
   storing said key encryption key in a server-private master key startup file.

6. The method of claim 1, further comprising:
   initializing the database server in an automatic master key access mode.

7. The method of claim 6, wherein said initializing comprises:
   reading a key encryption key of a master key copy from a master key startup file; and
   decrypting a master key automatic access copy using said key encryption key.

8. The method of claim 1, further comprising:
altering said first password from a first string to a second string.

9. The method of claim 8, wherein said altering comprises:
receiving said first string;
receiving said second string; and
receiving a command to alter said first key.

10. The method of claim 1, further comprising:
recovering said first key and said second key.

11. The method of claim 1, further comprising:
regenerating said first key and said second key.

12. The method of claim 11, wherein said regenerating comprises:
replacing a raw key value of said first key and said second key with a new raw key value; and
re-encrypting said third key with regenerated first and second keys.

13. The method of claim 1, further comprising:
updating a master key startup file.

14. A database server configured to protect encryption keys in a database, comprising:
a microprocessor; and
a memory in communication with said microprocessor, said memory storing a plurality of processing instructions, wherein said plurality of instructions direct said microprocessor to:
receive a first password at said database server from a first individual entity;
receive a second password at said database server from a second individual entity;
generate a first key, wherein said first key is protected using said first password;
generate a second key, wherein said second key is protected using said second password;
encrypt a third key using said second key to generate an encrypted third key, said third key being included in said encryption keys of said database; and
encrypt said encrypted third key using said first key, wherein use of said third key requires said first password to be provided to said database server by said first individual entity and said second password to be provided to said database server by said second individual entity, said first password being received at said database server separately and independently of said second password, said first individual entity being different and independent from said second individual entity, and said database server enforcing ownership of said first key by said first individual entity and enforcing ownership of said second key by said second individual entity.

15. The system of claim 14, wherein said database server includes a key management module.

16. The system of claim 14, wherein said first key and said second key are database level keys.

17. The system of claim 14, wherein said first and said second key are key encryption keys (KEKs) for user created keys.

18. The system of claim 17, wherein said plurality of instructions direct said microprocessor to use said first key in combination with said second key as a composite key to provide dual control and split knowledge for said user created keys.

19. The system of claim 14, wherein said memory is configured to store at least a portion of a system table of said database, said first key being defined in said system table.

20. The system of claim 14, wherein said database server is configurable to operate in an automatic master key access mode.

21. The system of claim 20, wherein said plurality of instructions direct said microprocessor to create a master key startup file for said automatic master key access mode.

22. The system of claim 21, wherein said plurality of instructions direct said microprocessor to read in external master key encryption keys (MKEKs) for said first key for all databases from said master key startup file into server memory.

23. The system of claim 21, wherein said plurality of instructions direct said microprocessor to create said master key startup file as a read only file.

24. A non-transitory computer program product having control logic stored therein, said control logic enabling a microprocessor to protect encryption keys in a database according to a method, said method comprising:
receiving a first password at a database server from a first individual entity, wherein said database server is associated with said database;
receiving a second password at said database server from a second individual entity;
generating a first key, wherein said first key is protected using said first password;
generating a second key, wherein said second key is protected using said second password;
encrypting a third key using said second key to generate an encrypted third key, said third key being included in said encryption keys of said database; and
encrypting said encrypted third key using said first key, wherein use of said third key requires said first password to be provided to said database server by said first individual entity and said second password to be provided to said database server by said second individual entity, said first password being received at said database server separately and independently of said second password, said first individual entity being different and independent from said second individual entity, and said database server enforcing ownership of said first key by said first individual entity and enforcing ownership of said second key by said second individual entity.

* * * * *